United States Patent
Hwang et al.

(10) Patent No.: US 9,086,511 B2
(45) Date of Patent: Jul. 21, 2015

(54) LIGHT SOURCE ASSEMBLY, BACKLIGHT ASSEMBLY HAVING THE SAME AND DISPLAY APPARATUS HAVING THE SAME

(71) Applicant: SAMSUNG DISPLAY CO., LTD., Yongin, Gyeonggi-Do (KR)

(72) Inventors: In-Sun Hwang, Suwon-si (KR); Jung-Kyun Kim, Seoul (KR)

(73) Assignee: SAMSUNG DISPLAY CO., LTD., Yongin, Gyeonggi-Do (KR)

( * ) Notice: Subject to any disclaimer, the term of this patent is extended or adjusted under 35 U.S.C. 154(b) by 51 days.

(21) Appl. No.: 14/092,290

(22) Filed: Nov. 27, 2013

(65) Prior Publication Data

US 2015/0023055 A1  Jan. 22, 2015

(30) Foreign Application Priority Data

Jul. 19, 2013 (KR) .................. 10-2013-0085367

(51) Int. Cl.
*F21V 8/00* (2006.01)
*F21K 99/00* (2010.01)
*G02F 1/01* (2006.01)

(52) U.S. Cl.
CPC ............... *G02B 6/0025* (2013.01); *F21K 9/56* (2013.01); *G02F 1/01* (2013.01)

(58) Field of Classification Search
CPC ................... G02B 6/0025; F21K 9/56
See application file for complete search history.

(56) References Cited

U.S. PATENT DOCUMENTS

| 7,518,150 | B2 | 4/2009 | Aihara |
| 7,703,972 | B2 | 4/2010 | Park et al. |
| 8,121,166 | B2 | 2/2012 | Van Sprang et al. |
| 8,152,351 | B2 * | 4/2012 | Karakawa ..................... 362/613 |
| 2005/0057145 | A1 | 3/2005 | Shieh et al. |
| 2012/0154464 | A1 | 6/2012 | Ninan et al. |
| 2013/0033901 | A1 | 2/2013 | Nishitani et al. |

FOREIGN PATENT DOCUMENTS

| JP | 2009-170723 | 7/2009 |
| KR | 1020090054841 | 6/2009 |
| KR | 1020120134240 | 12/2012 |

* cited by examiner

*Primary Examiner* — Mary Ellen Bowman
(74) *Attorney, Agent, or Firm* — F. Chau & Associates, LLC (57) ABSTRACT

A light source assembly includes a red laser diode configured to generate a red laser light, a blue laser diode disposed adjacent to the red laser diode, and configured to generate a blue laser light or a cyan laser light, a green phosphor disposed on the blue laser diode, and configured to change a wavelength of the blue laser light or the cyan laser light, and a holographic diffuser disposed on the green phosphor and the red laser diode. The holographic diffuser is configured to diffuse or scatter the red laser light and is configured to diffuse or scatter the blue laser light or the cyan laser light which passed the green phosphor.

23 Claims, 6 Drawing Sheets

LIGHT SOURCE ASSEMBLY, BACKLIGHT ASSEMBLY HAVING THE SAME AND DISPLAY APPARATUS HAVING THE SAME

CROSS REFERENCE TO RELATED APPLICATION

This application claims priority to Korean Patent Application No. 10-2013-0085367, filed on Jul. 19, 2013, the disclosure of which is hereby incorporated by reference herein in its entirety.

1. TECHNICAL FIELD

Exemplary embodiments of the invention relate to a light source assembly, a backlight assembly having the light source assembly and a display apparatus having the backlight assembly.

More particularly, exemplary embodiments of the present invention relate to a light source assembly for a liquid crystal display apparatus, a backlight assembly having the light source assembly and a display apparatus having the backlight assembly.

2. DISCUSSION OF THE RELATED ART

Recently, a liquid display apparatus having a light weight and a small size has been manufactured. A cathode ray tube (CRT) display apparatus has been used due to performance and a competitive price. However, the CRT display apparatus may have difficulties in connection with features such as size or portability. Therefore, the liquid display apparatus has been highly regarded due to its small size, light weight and low-power-consumption.

The liquid display apparatus applies a voltage to a specific molecular arrangement of liquid crystals and is configured to change the molecular arrangement. The liquid display apparatus displays an image using changes of optical properties (e.g., birefringence, rotatory polarization, dichroism and light scattering) of a liquid crystal cell according to the changes of the molecular arrangement.

The liquid display apparatus includes a backlight assembly generating white light to display the image. The backlight assembly generally has, for example, a light emitting diode (LED) as a light source. However, a range of a color gamut of the liquid display apparatus using the LED may be limited.

SUMMARY

Exemplary embodiments of the invention provide a light source assembly capable of increasing a range of a color gamut.

Exemplary embodiments of the invention also provide a backlight assembly having the light source assembly.

Exemplary embodiments of the invention also provide a display apparatus having the backlight assembly.

According to an exemplary embodiment of the invention, a light source assembly includes a red laser diode configured to generate a red laser light, a blue laser diode disposed adjacent to the red laser diode, and configured to generate a blue (or laser light or a cyan laser light, a green phosphor disposed on the blue laser diode, and configured to change a wavelength of the blue laser light or the cyan laser light, and a holographic diffuser disposed on the green phosphor and the red laser diode. The holographic diffuser is configured to diffuse or scatter the red laser light and is configured to diffuse or scatter the blue laser light or the cyan laser light which passed the green phosphor.

In an exemplary embodiment, the green phosphor may contact with the holographic diffuser.

In an exemplary embodiment, the green phosphor may contact with the blue laser diode. The green phosphor may be disposed between the blue laser diode and the holographic diffuser.

In an exemplary embodiment, the green phosphor may include a quantum dot nano-phosphor.

In an exemplary embodiment, the quantum dot nano-phosphor may include a particle. The particle may include a core which includes at least one of cadmium sulfide (CdS) and cadmium selenide (CdSe), and a shell which surrounds the core and includes at least one of zinc sulfide (ZnS), cadmium sulfide (CdS) and zinc selenide (ZnSe). In addition, at least one trioctylphosphine (TOP) and a ligand of oleic acid may be attached on an outer surface of the shell.

According to another exemplary embodiment of the invention, a backlight assembly includes a substrate, a plurality of red laser diodes disposed on the substrate, and configured to generate a red laser light, a plurality of blue laser diodes disposed adjacent to the red laser diodes and on the substrate, and configured to generate a blue laser light or a cyan laser light, a green phosphor disposed on the blue laser diodes, and configured to change a wavelength of the blue laser light or the cyan laser light, a light guiding plate, a holographic diffuser disposed between a light incident surface and the red and blue laser diodes. The light guiding plate includes the light incident surface configured such that the red laser light enters into the light incident surface and the blue laser light or the cyan laser light enters into the light incident surface and a light exiting surface disposed adjacent to the light incident surface and configured such that the red laser light exits the light guiding plate through the light exiting surface and the blue laser light or the cyan laser light exits the light guiding plate through the light exiting surface.

In an exemplary embodiment, the red laser diodes and the blue laser diodes may be alternately disposed along the light incident surface.

In an exemplary embodiment, the holographic diffuser may be a sheet having a size substantially the same as a size of the light incident surface.

In an exemplary embodiment, each of the red and blue laser light may be diffused by passing the holographic diffuser. The red laser light from the red laser diode which is diffused by passing the holographic diffuser, may partially overlap with the blue laser light or the cyan laser light from an adjacent blue laser diode which is diffused by passing the holographic diffuser, on the light incident surface.

In an exemplary embodiment, width of each of the red and blue laser light on the light incident surface may be no greater than a width of the light incident surface.

In an exemplary embodiment, a horizontal divergence angle of the laser light on the holographic diffuser may be about 30° (degrees) to about 85°.

In an exemplary embodiment, a vertical divergence angle of the laser light on the holographic diffuser may be about 5° (degrees) to about 60°.

In an exemplary embodiment, the holographic diffuser may contact with the light incident surface of the light guiding plate.

In an exemplary embodiment, the green phosphor may contact with the holographic diffuser.

In an exemplary embodiment, the light guiding plate may further include a reflecting surface disposed opposite to the light exiting surface, and a reflecting element disposed under the reflecting surface.

In an exemplary embodiment, the green phosphor may contact with the blue laser diode.

In an exemplary embodiment, the green phosphor may include a quantum dot nano-phosphor. The quantum dot nano-phosphor may include a particle. The particle includes a core which includes at least one of cadmium sulfide (CdS) and cadmium selenide (CdSe), and a shell which surrounds the core and includes at least one of zinc sulfide (ZnS), cadmium sulfide (CdS) and zinc selenide (ZnSe). In addition, at least one of trioctylphosphine (TOP) and a ligand of oleic acid may be attached on an outer surface of the shell.

According to an exemplary embodiment of the invention, a display apparatus includes backlight assembly, a display panel disposed on the backlight assembly, and a receiving container configured to receive the backlight assembly and the display panel therein. The backlight assembly includes a substrate, a plurality of red laser diodes disposed on the substrate, and configured to generate a red laser light, a plurality of a blue laser diodes disposed adjacent to the red laser diode and on the substrate, and configured to generate a blue laser light or a cyan laser light, a green phosphor disposed on the blue laser diodes, and configured to change a wavelength of the blue laser light or the cyan laser light, a light guiding plate, a holographic diffuser disposed between a light incident surface and the red and blue laser diodes. The light guiding plate includes the light incident surface configured such that the red laser light enters into the light incident surface and the blue laser light or the cyan laser light enters into the light incident surface and a light exiting surface disposed adjacent to the light incident surface and configured such that the red laser light exits the light guiding plate through the light exiting surface and the blue laser light or the cyan laser light exits the light guiding plate through the light exiting surface. The red laser diodes and the blue laser diodes are alternately disposed along the light incident surface.

In an exemplary embodiment, the display apparatus may further include an optical element configured to make a brightness of the laser light from the light guiding plate uniform.

In an exemplary embodiment, the light guiding plate further include a reflecting surface disposed opposite to the light exiting surface, and a reflecting element disposed under the reflecting surface.

In accordance with an exemplary embodiment, a backlight assembly is provided. The backlight assembly includes a substrate, a plurality of red laser diodes and a plurality of blue laser diodes alternatively disposed on the substrate, in which the red laser diodes are configured to generate a red laser light and the blue laser diodes are configured to generate a blue laser light or a cyan laser light, a light guiding plate including a light incident surface configured such that the red laser light enters into the light incident surface and the blue laser light or the cyan laser light enters into the light incident surface, and a light exiting surface disposed adjacent to the light incident surface and configured such that the red laser light exits the light guiding plate through the light exiting surface and the blue laser light or the cyan laser light exits the light guiding plate through the light exiting surface.

The backlight unit further includes a green phosphor disposed directly on the light incident surface of the light guiding plate on an area of the light incident surface corresponding to the blue laser diode, in which the green phosphor is configured to change a wavelength of the blue laser light or the cyan laser light and a holographic diffuser disposed in between the light incident surface and the red and blue laser diodes and spaced apart from the light incident surface and the red and blue laser diodes.

According to the exemplary embodiments of the present invention, the display apparatus includes a light source assembly having a red laser diode, a blue laser diode, a green phosphor and a holographic diffuser. Laser light from the laser diodes has a full width at half maximum (FWHM) smaller than that of a traditional light source of a display apparatus such as a light emitting diode, so that the display apparatus according to exemplary embodiments of the present invention may have a Color Gamut larger than that of a traditional display apparatus. Thus, display quality may be increased.

In addition, the green phosphor includes a quantum dot nano-phosphor. The laser light may have a full width at half maximum similar to a full width at half maximum of a green laser diode, so that the display apparatus according to exemplary embodiments of the present invention may have a Color Gamut larger than that of a traditional display apparatus. Thus, display quality may be increased.

In addition, the light source assembly includes only the red laser diode and the blue laser diode. White light may be formed without a green laser diode, so that manufacturing costs may be decreased in comparison to a display apparatus with the green laser diode.

In addition, the red laser light may partially overlap the blue laser light or the cyan laser light, which is from the adjacent blue laser diode and diffused by the holographic diffuser, on the light incident surface. A width of the laser light on the light incident surface may be substantially same as or smaller than width of the light incident surface. Thus, the laser light may be uniformly incident into the whole light incident surface.

BRIEF DESCRIPTION OF THE DRAWINGS

Exemplary of the invention can be understood in more detail from the following detailed description taken in conjunction with the accompanying drawings, in which.

DETAILED DESCRIPTION OF EXEMPLARY EMBODIMENTS

Hereinafter, exemplary embodiments of the invention will be explained in detail with reference to the accompanying drawings.

Figure 1:
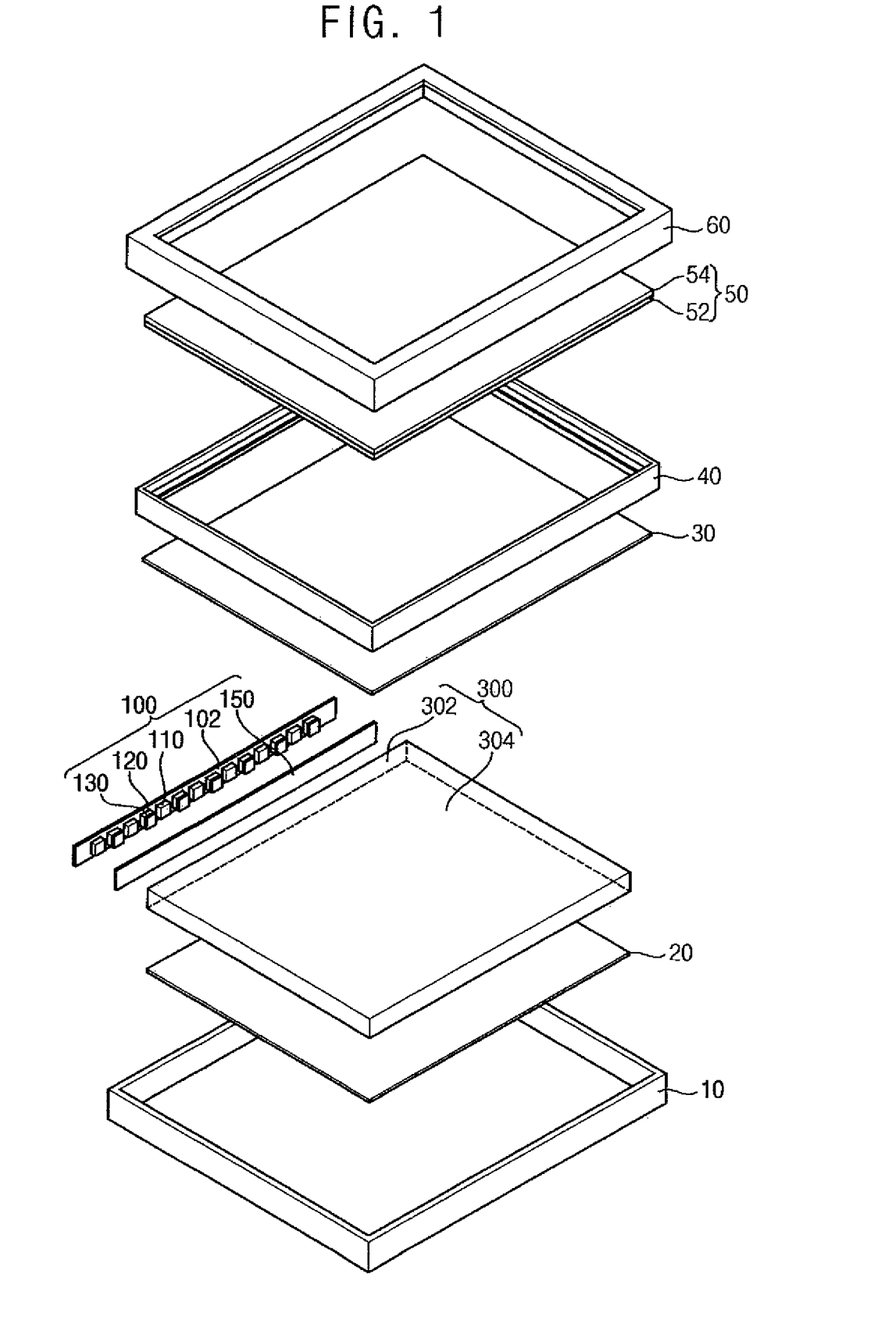
FIG. 1 is a exploded perspective view illustrating a display apparatus according to an exemplary embodiment of the invention.

FIG. 1 is a exploded perspective view illustrating a display apparatus according to an exemplary embodiment of the invention.

Referring to FIG. 1, a display apparatus includes, for example, a backlight assembly having a light source assembly 100 and a light guiding plate 300, a receiving container having a bottom chassis 10 and a top chassis 60, a reflecting element 20, an optical element 30, a mold frame 40 and a display panel 50 having an array substrate 52 and an opposite substrate 54. In an embodiment, the bottom chassis 10 may be formed of a metal material. For example, in an exemplary embodiment, the bottom chassis 10 may include aluminum or an aluminum alloy.

In an embodiment, the top chassis 60 may be formed of a metal material. For example, in an exemplary embodiment, the top chassis 60 may include aluminum or an aluminum alloy.

In an embodiment, the mold frame 40 may be formed of, for example, an insulating material. For example, in an exemplary embodiment, the mold frame 40 may be formed of a synthetic resin.

The light source assembly 100 includes, for example, a substrate. 102, a red laser diode 110, a blue laser diode 120, a green phosphor 130 and a holographic diffuser 150.

The substrate 102 includes, for example, a circuit for driving the light source assembly 100. For example, the substrate 102 may be a printed circuit board including a driving circuit to drive the red laser diode 110 and the blue laser diode 120.

The red laser diode 110 is disposed on the substrate 102. The red laser diode 110 generates red laser light, and emits the red laser light to a light incident surface 302 of the light guiding plate 300. The red laser diode 110 may be, for example, a traditional laser diode (LD) which emits red laser light.

The blue laser diode 120 is disposed on the substrate 102 and adjacent to the red laser diode 110. The blue laser diode 120 generates blue or cyan laser light, and emits the blue or cyan laser light to the light incident surface 302 of the light guiding plate 300. The blue laser diode 120 may be, for example, a traditional laser diode which emits blue or cyan laser light.

The red laser diode 110 and the blue laser diode 120 are, for example, alternately disposed on the substrate 102 and along the light incident surface 302 of the light guiding plate 300. Thus, a plurality of red laser diodes 110 and a plurality of blue laser diode 120 are, for example, alternately disposed on the substrate 102 and along the light incident surface 302 of the light guiding plate 300.

The green phosphor 130 is disposed on the blue laser diode 120. The green phosphor 130 changes a wavelength of the blue laser light or the cyan laser light from the blue laser diode 120. Thus, laser light from the red laser diode 110 and laser light from the blue laser diode 120, which passes the green phosphor 130, are mixed with each other, so that white light may be formed. The green phosphor 130 may include, for example, a quantum dot nano-phosphor. For example, the green phosphor 130 may include a particle. For example, the particle includes a core which includes cadmium sulfide (CdS), cadmium selenide (CdSe), cadmium telluride (CdTe), indium gallium phosphide (InGaP), zinc selenide (ZnSe), zinc telluride (ZnTe), zinc sulfide (ZnS), mercury telluride (HgTe), mercury sulfide (HgS), or a combination thereof and a shell which surrounds the core and includes zinc sulfide (ZnS), cadmium sulfide (CdS), zinc selenide (ZnSe), copper zinc sulfide (CuZnS), cadmium selenide (CdSe), cadmium telluride (CdTe), zinc telluride (ZnTe), mercury telluride (HgTe), mercury sulfide (HgS) or a combination thereof. In addition, for example, in an embodiment, trioctylphosphine (TOP) and/or a ligand of oleic acid are attached on an outer surface of the shell.

The light guiding plate 300 guides the laser light generated from the light source assembly 100 to the display panel 50. The light guiding plate 300 converts an incident light having a light distribution of the spot light source or the line light source to an exiting light having a light distribution of a surface light source. Thus, the light guiding plate 300 changes a path of the laser light from the light source assembly 100 to guide the laser light to the display panel 50.

The light guiding plate 300 includes, for example, the light incident surface 302 and a light exiting surface 304 adjacent to the light incident surface 302. The laser light enters into the light incident surface 302, and exits through the light exiting surface 304. Thus, the laser light generated from the red laser diode 110 and the blue laser diode 120 pass inside of light guiding plate 300 through the light incident surface 302. The laser light is guided inside of the light guiding plate 300 to the light exiting surface 304, and exits through the light exiting surface 304. The light exiting surface 304 of the light guiding plate 300 faces the display panel 50. The light guiding plate 300 may further include, for example, a reflecting surface reflecting the laser light. Although the light guiding plate 300 has a uniform thickness in the present example embodiment, the light guiding plate 300 may have various shapes. For example, the light guiding plate 300 may have a wedge shaped cross section, such that a thickness of the light guiding plate 300 adjacent to the light source assembly 100 is thinner than a thickness of the light guiding plate 300 far from the light source assembly 100.

In an embodiment, the light guiding plate 300 may be formed of, for example, a resin based material such as polymethylmethacrylate (PMMA), a polyethylene terephthalate (PET) resin, a polycarbonate (PC) resin, a cyclic olefin copolymer (COC) resin, and a polyethylene naphthalate (PEN) resin.

The holographic diffuser 150 is, for example, disposed between the light incident surface 302 of the light guiding plate 300 and the green phosphor 130, and between the light incident surface 302 and the red laser diode 110. The holographic diffuser 150 diffuses or scatters the laser light. The holographic diffuser 150 is an example of holographic optical element. The holographic optical element uses a hologram as an optical element configured to regenerate or change hologram recorded waveforms into desired waveforms. The holographic diffuser 150 may be, for example, a sheet corresponding to the light incident surface 302 of the light guiding plate 300. In the present embodiment, the holographic diffuser 150 is, for example, one sheet corresponding to all of the red laser diodes 110 and the blue laser diodes 120. Alternatively, for example, in an embodiment, a plurality of holographic diffusers 150 may be formed corresponding to each of the red and blue laser diodes 110 and 120.

The backlight assembly will be described in detail in FIG. 2.

The receiving container receives the backlight assembly, the reflecting element 20, the optical element 30, the mold frame 40 and the display panel 50 therein. The receiving container includes, for example, a bottom chassis 10 and a top chassis 60.

The reflecting element 20 is disposed under the light guiding plate 300. The reflecting element 20 reflects the laser light, which entered through the light incident surface 302 of the light guiding plate 300, toward the light exiting surface 304. For example, the reflecting element 20 may be a reflecting sheet disposed under the light guiding plate 300. In addition, the reflecting element 20 may be a coating layer on the reflecting surface of the light guiding plate 300 which is formed by a coating process. For example, in an exemplary embodiment, reflecting element 20 may be formed of polyethylene terephthalate (PET) or aluminum. Alternatively, in an exemplary embodiment, the reflecting element 20 may include other materials such as, for example, polybutylene terephthalate (PBT) or a resin such as polycarbonate (PC) blended in polyethylene terephthalate (PET) or polybutylene terephthalate (PBT).

The optical element 30 is disposed on the light exiting surface 304 of the light guiding plate 300. The optical element 30 may increase optical properties of the laser light from the light guiding plate 300. Thus, the optical element 30 may make the brightness of the light from the light guiding plate 300 be uniform. The optical element 30 may include, for example, plurality of optical sheets. For example, optical element 30 may include a protecting sheet, a prism sheet and a diffusion sheet. The diffusion sheet is disposed on the light exiting surface of the light guiding plate 300. The prism sheet is disposed on the diffusion sheet. The protecting sheet is disposed on the prism sheet. The prism sheet may include an upper prism sheet and a lower prism sheet. An axis of the upper prism sheet may be substantially perpendicular to an axis of the lower prism sheet. Although the optical element 30 is described as including the protecting sheet, the prism sheet and the diffusion sheet, many modifications of the optical sheet may be possible.

The mold frame 40 supports and fixes elements in the display apparatus. For example, the mold frame 40 supports and fixes the display panel 50 in the display apparatus.

The display panel 50 displays an image using light from the backlight assembly according to a driving signal and a data signal. The display panel 50 includes, for example, an array substrate 52, an opposite substrate 54 facing the array substrate 52, and a liquid crystal layer (not shown) disposed between the array substrate 52 and the opposite substrate 54.

The array substrate 52 may include, for example, a plurality of gate lines, a plurality of data lines crossing the gate lines, and a plurality of switching element connected to the gate and data lines. The opposite substrate 54 may include, for example, a black matrix blocking light and a color filter having a color. The opposite substrate 54 includes the color filter in the present example embodiment. However, alternatively in an embodiment, the color filter may be formed in the array substrate 52. The liquid crystal layer is disposed between the array substrate 52 and the opposite substrate 54. The liquid crystal layer includes liquid crystal molecules having, for example, optical anisotrophy. The liquid crystal molecules are driven by an electric field, so that light may pass through or be blocked by the liquid crystal layer to display an image.

The display panel 50 may be electrically connected to a driving part (not shown) to drive the display panel 50. For example, the driving part may be a flexible printed circuit board. The driving part may be electrically connected to the array substrate 52. The driving part may be disposed under or on the side of the backlight assembly.

The bottom chassis 10 receives the backlight assembly, the reflecting element 20, the optical element 30, the mold frame 40, and the display panel 50 therein. The top chassis 60 may be combined with the bottom chassis 10.

Figure 2:
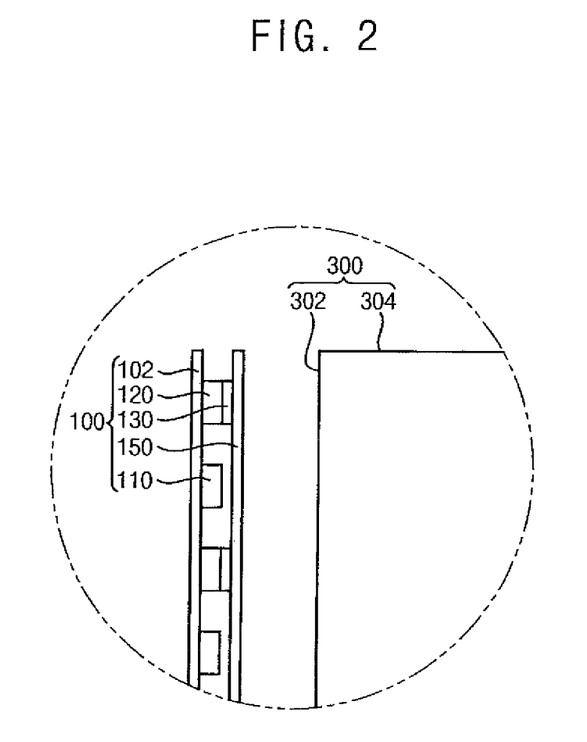
FIG. 2 is a partially enlarged plan view of a backlight assembly of FIG. 1.

FIG. 2 is a cross-sectional view taken along a line I-I' of FIG. 1.

Referring to FIG. 2, a backlight assembly includes, for example, a light source assembly 100 and a light guiding plate 300. The light source assembly 100 includes, for example, a substrate 102, a red laser diode 110, a blue laser diode 120, a green phosphor 130 and a holographic diffuser 150.

A plurality of the red laser diodes 110 and a plurality of blue laser diodes 120 are, for example, alternately disposed along an light incident surface 302 of the light guiding plate 300 on the substrate 102. The green phosphor 130 is disposed on each of the blue laser diodes 120. The green phosphor 130 may be formed by, for example, coating a green phosphor on the blue laser diode 120. In addition, the green phosphor 130 may be formed by, for example, attaching the green phosphor 130 on the blue laser diode 120.

The holographic diffuser 150 is disposed on the green phosphor 130 and the red laser diode 110. The holographic diffuser 150 may be bonded on the green phosphor 130. Accordingly, the holographic diffuser 150 contacts with the green phosphor 130, and is spaced apart form the light incident surface 302 of the light guiding plate 300. The holographic diffuser 150 diffuses or scatters the laser light from the light source assembly. Thus, when the laser light enter into the light incident surface 302 which is spaced apart from the holographic diffuser 150 by a specific distance, the laser light may be uniformly incident into the whole light incident surface 302.

The red laser diode 110 and the holographic diffuser 150 are spaced apart form each other in the present exemplary embodiment of the present invention. However, alternatively, in an exemplary embodiment, the red laser diode 110 and the holographic diffuser 150 may, for example, contact each other as occasion demands.

The laser light from the red laser diode 110 and the laser light from the blue laser diode 120, which pass the green phosphor 130, are incident into the light guiding plate 300 through the holographic diffuser 150, and are mixed with each other. Thus, white light which is used for the display apparatus as a light source may be formed.

The laser light from the red laser diode 110 and the blue laser diode 120 has a full width at half maximum (FWHM) smaller than that of a traditional light source of a display apparatus such as a light emitting diode, so that the display apparatus according to exemplary embodiments of the present invention may have a Color Gamut larger than that of a traditional display apparatus. Thus, display quality may be increased.

In addition, the green phosphor 130 includes, for example, a quantum dot nano-phosphor. The laser light may have a full width at half maximum similar to a full width at half maximum of a green laser diode, so that the display apparatus according to exemplary embodiments of the present invention may have a Color Gamut larger than that of a traditional display apparatus. Thus, display quality may be increased.

In addition, the light source assembly 100 includes only the red laser diode 110 and the blue laser diode 120. The white light may be formed without a green laser diode, so that manufacturing costs may be decreased in comparison to a display apparatus with the green laser diode.

Figure 3:
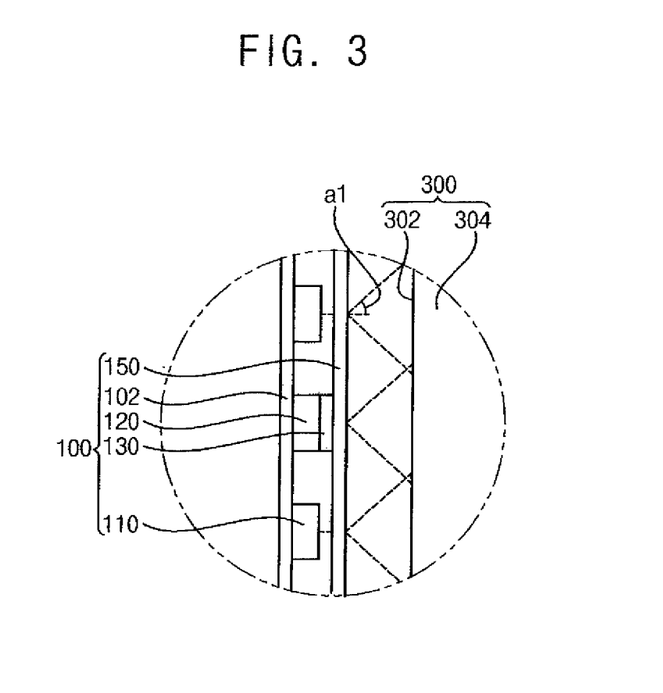
FIG. 3 is a partially enlarged plan view illustrating a light path of the backlight assembly of FIG. 1.
Figure 4:
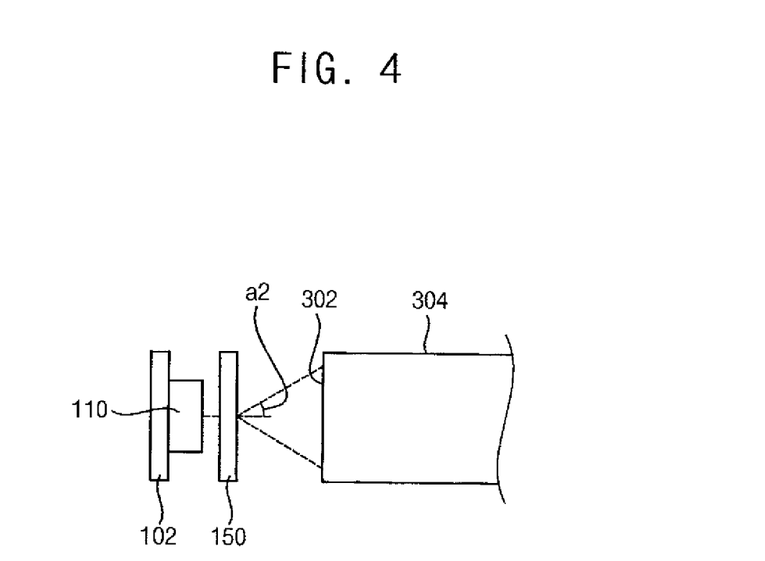
FIG. 4 is a partially enlarged cross-sectional view illustrating the light path of the backlight assembly of FIG. 1.

FIG. 3 is a partially enlarged plan view illustrating a light path of the backlight assembly of FIG. 1. FIG. 4 is a partially enlarged cross-sectional view illustrating the light path of the backlight assembly of FIG. 1.

Referring to FIGS. 3 and 4, a light source assembly 100 includes, for example, a substrate 102, a red laser diode 110, a blue laser diode 120, a green phosphor 130 and a holographic diffuser 150. A light guiding plate 300 includes, for example, a light incident surface 302 and a light exiting surface 304.

Laser light from the red laser diode 110 is diffused by passing through the holographic diffuser 150. The laser light from the red laser 110 which is diffused by the holographic diffuser 150 may partially overlap laser light, which is from the adjacent blue laser diode 120 and diffused by the holographic diffuser 150, on the light incident surface 302. For example, a horizontal divergence angle a1 of the laser light on the holographic diffuser 150 may be about 30° (degrees) to about 85°. In addition, the laser light may be, for example, overlapped with laser light from adjacent laser diode in a display area in which an image is displayed.

The width of the laser light on the light incident surface 302 is substantially same as or smaller than a width of the light incident surface 302. The width of the laser light is a width of the laser light from the red laser diode 110 and diffused by the holographic diffuser 150 along a thickness direction of the display apparatus (refers to FIG. 4). Thus, the laser light may be incident into the light incident surface 302 of the light guiding plate 300 without light loss. For example, a vertical divergence angle a2 of the laser light on the holographic diffuser 150 may be about 5° (degrees) to about 60°

Figure 5:
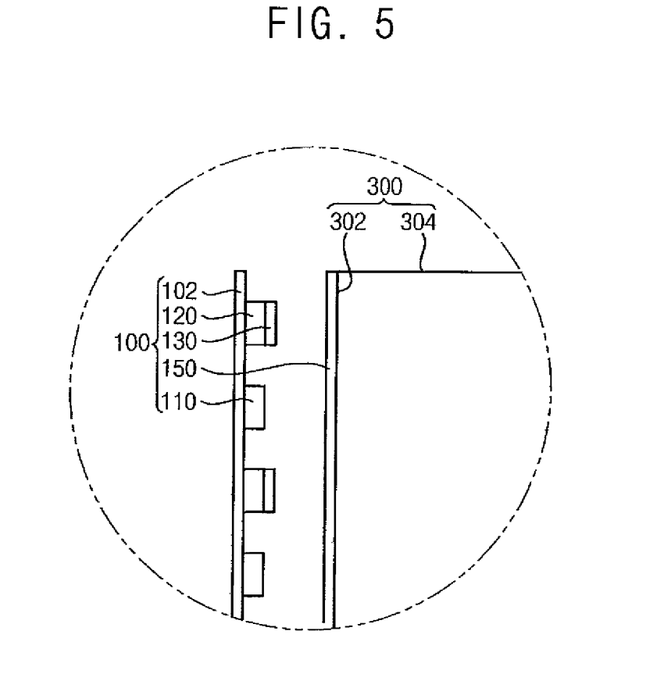
FIG. 5 is a partially enlarged plan view illustrating a backlight assembly according to an exemplary embodiment of the invention.

FIG. 5 is a partially enlarged plan view illustrating a backlight assembly according to an exemplary embodiment of the invention.

Referring to FIG. 5, a backlight assembly is substantially same as a backlight assembly of FIG. 2, except for a holographic diffuser 150 disposed on a light incident surface 302 of the light guiding plate 300. Thus, any further detailed descriptions concerning the same elements will be omitted.

The backlight assembly includes, for example, a light source assembly 100 and a light guiding plate 300. The light source assembly 100 includes, for example, a substrate 102, a red laser diode 110, a blue laser diode 120, a green phosphor 130 and a holographic diffuser 150.

A plurality of the red laser diodes 110 and a plurality of blue laser diodes 120 are, for example, alternately disposed along a light incident surface 302 of the light guiding plate 300 on the substrate 102. The green phosphor 130 is disposed on each of the blue laser diodes 120.

The holographic diffuser 150 is disposed on the light incident surface 302 of the light guiding plate 300. The holographic diffuser 150 may be bonded on the light incident surface 302. Accordingly, the holographic diffuser 150 is spaced apart from the green phosphor 130.

Laser light from the red and blue laser diodes 110 and 120 are diffused by passing the holographic diffuser 150 and are mixed with each other in the light guiding plate 300.

Figure 6:
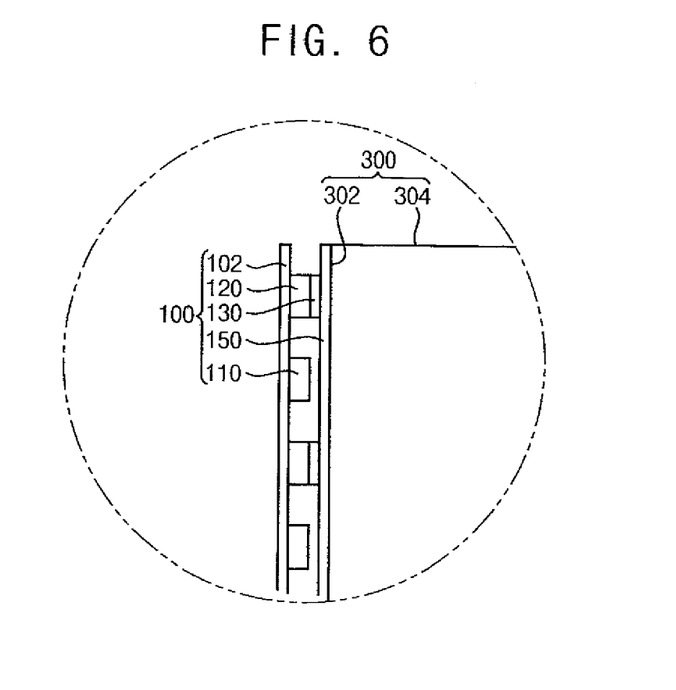
FIG. 6 is a partially enlarged plan view illustrating a backlight assembly according to an exemplary embodiment of the invention.

FIG. 6 is a partially enlarged plan view illustrating a backlight assembly according to an exemplary embodiment of the invention.

Referring to FIG. 6, a backlight assembly is substantially the same as a backlight assembly of FIG. 5, except for a holographic diffuser 150 contacting to a green phosphor 130. Thus, any further detailed descriptions concerning the same elements will be omitted.

The backlight assembly includes, for example, a light source assembly 100 and a light guiding plate 300. The light source assembly 100 includes, for example, a substrate 102, a red laser diode 110, a blue laser diode 120, a green phosphor 130 and a holographic diffuser 150.

A plurality of the red laser diodes 110 and a plurality of blue laser diodes 120 are, for example, alternately disposed along a light incident surface 302 of the light guiding plate 300 on the substrate 102. The green phosphor 130 is disposed on each of the blue laser diodes 120.

The holographic diffuser 150 is disposed on the green phosphor 130, and contacts with the light incident surface 302 of the light guiding plate 300. The holographic diffuser 150 may be bonded on the green phosphor 130, or attached on the light incident surface 302. Thus, the holographic diffuser 150 may be bonded between the green phosphor 130 and the light incident surface 302. Thus, the light guiding plate 300 and the light source assembly 100 may be, for example, integrally formed as one module.

Figure 7:
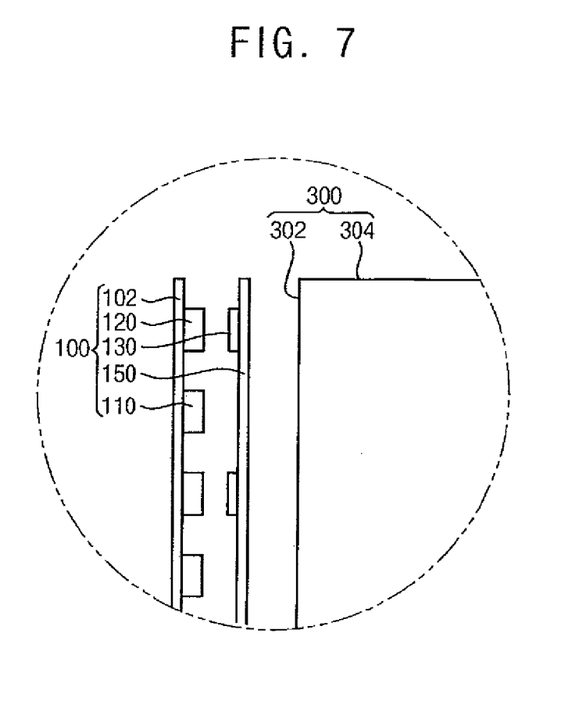
FIG. 7 is a partially enlarged plan view illustrating a backlight assembly according to an exemplary embodiment of the invention.

FIG. 7 is a partially enlarged plan view illustrating a backlight assembly according to an exemplary embodiment of the invention.

Referring to FIG. 7, a backlight assembly is substantially same as a backlight assembly of FIG. 2, except for a green phosphor 130 disposed on a holographic diffuser 150. Thus, any further detailed descriptions concerning the same elements will be omitted.

The backlight assembly includes, for example, a light source assembly 100 and a light guiding plate 300. The light source assembly 100 includes, for example, a substrate 102, a red laser diode 110, a blue laser diode 120, a green phosphor 130 and a holographic diffuser 150.

A plurality of the red laser diodes 110 and a plurality of blue laser diodes 120 are, for example, alternately disposed along a light incident surface 302 of the light guiding plate 300 on the substrate 102.

The holographic diffuser 150 is spaced apart from the substrate 102 on which the red and blue laser diodes 110 and 120 are disposed. The green phosphor 130 is disposed on a surface of the holographic diffuser 150, which faces the red and blue laser diodes 110 and 120. The green phosphor 130 is disposed corresponding to the blue laser diode 120. For example, the green phosphor 130 may be formed by coating green phosphor on the holographic diffuser 150.

The holographic diffuser 150 is spaced apart from the light incident surface 302, so that laser light from the red and blue laser diodes 110 and 120 may be diffused by passing the holographic diffuser 150. Thus, the laser light may be uniformly incident into the whole light incident surface 302.

Figure 8:
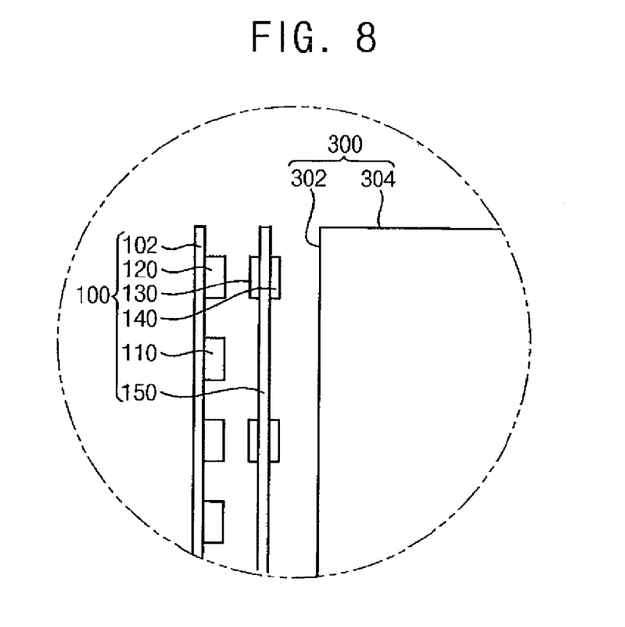
FIG. 8 is a partially enlarged plan view illustrating a backlight assembly according to an exemplary embodiment of the invention.

FIG. 8 is a partially enlarged plan view illustrating a backlight assembly according to an exemplary embodiment of the invention.

Referring to FIG. 8, a backlight assembly is substantially the same as a backlight assembly of FIG. 7, except for a sub phosphor 140. Thus, any further detailed descriptions concerning the same elements will be omitted.

The backlight assembly includes, for example, a light source assembly 100 and a light guiding plate 300. The light source assembly 100 includes, for example, a substrate 102, a red laser diode 110, a blue laser diode 120, a green phosphor 130, a sub phosphor 140 and a holographic diffuser 150.

A plurality of the red laser diodes 110 and a plurality of blue laser diodes 120 are, for example, alternately disposed along a light incident surface 302 of the light guiding plate 300 on the substrate 102.

The holographic diffuser 150 is spaced apart from the substrate 102 on which the red and blue laser diodes 110 and 120 are disposed. The green phosphor 130 is disposed on a surface of the holographic diffuser 150, which faces the red and blue laser diodes 110 and 120. The green phosphor 130 is disposed corresponding to the blue laser diode 120. For example, the green phosphor 130 may be formed by coating green phosphor on the holographic diffuser 150.

The sub phosphor 140 is disposed on a surface of the holographic diffuser 150 which faces the light incident surface 302. The surface of the holographic diffuser 150 on which the sub phosphor 140 is disposed is opposite to a surface of the holographic diffuser 150 which faces the red and blue laser diodes 110 and 120. The sub phosphor 140 may change a wavelength of the laser light from the blue and red laser diodes 110 and 120. Thus, the sub phosphor 140 may additionally change the wavelength of the laser light which passed the holographic diffuser 150. For example, the sub phosphor 140 may include a quantum dot nano-phosphor, and the sub phosphor 140 is disposed corresponding to the blue laser diode 120.

Figure 9:
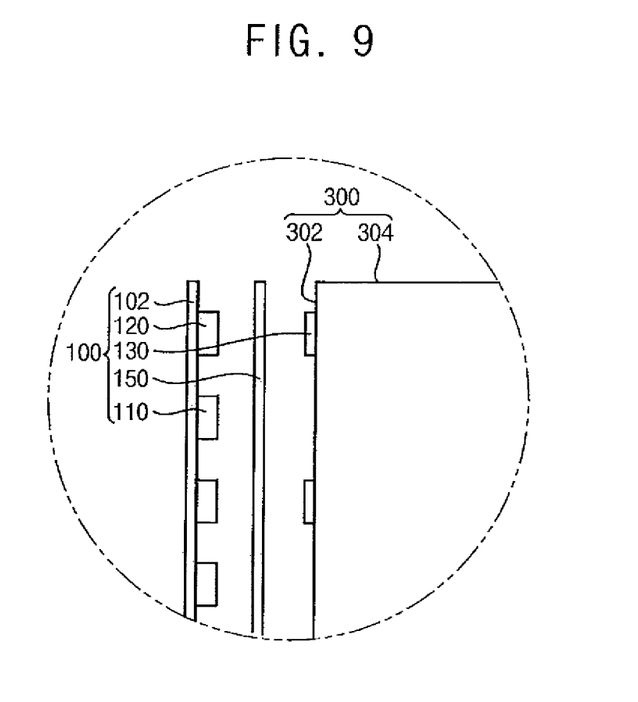
FIG. 9 is a partially enlarged plan view illustrating a backlight assembly according to an exemplary embodiment of the invention.

FIG. 9 is a partially enlarged plan view illustrating a backlight assembly according to an exemplary embodiment of the invention.

Referring to FIG. 9, a backlight assembly is substantially the same as a backlight assembly of FIG. 7, except for a green phosphor 130 disposed on a light incident surface 302. Thus, any further detailed descriptions concerning the same elements will be omitted.

The backlight assembly includes, for example, a light source assembly 100 and a light guiding plate 300. The light source assembly 100 includes, for example, a substrate 102, a red laser diode 110, a blue laser diode 120, a green phosphor 130 and a holographic diffuser 150.

A plurality of the red laser diodes 110 and a plurality of blue laser diodes 120 are, for example, alternately disposed along a light incident surface 302 of the light guiding plate 300 on the substrate 102.

The holographic diffuser 150 is spaced apart from the substrate 102 on which the red and blue laser diodes 110 and 120 are disposed.

The green phosphor 130 is disposed on the light incident surface 302 corresponding to the blue laser diode 120. For example, the green phosphor 130 may be formed by coating green phosphor on the light incident surface 302.

Having described exemplary embodiments of the present invention, it is further noted that it is readily apparent to those of ordinary skill in the art that various modifications may be made without departing from the spirit and scope of the invention which is defined by the metes and bounds of the appended claims.

What is claimed is:
1. A light source assembly comprising:
a red laser diode configured to generate a red laser light;
a blue laser diode disposed adjacent to the red laser diode, and configured to generate a blue laser light or a cyan laser light;
a green phosphor disposed on the blue laser diode, and configured to change a wavelength of the blue laser light or the cyan laser light; and
a holographic diffuser disposed on the green phosphor and the red laser diode, wherein the holographic diffuser is configured to diffuse or scatter the red laser light and is configured to diffuse or scatter the blue laser light or the cyan laser light which passed the green phosphor.
2. The light source assembly of claim 1, wherein the green phosphor contacts with the holographic diffuser.
3. The light source assembly of claim 2, wherein the green phosphor contacts with the blue laser diode, and is disposed between the blue laser diode and the holographic diffuser.
4. The light source assembly of claim 1, wherein the green phosphor comprises a quantum dot nano-phosphor.

5. The light source assembly of claim 4, wherein the quantum dot nano-phosphor comprises a particle,
wherein the particle comprises a core which includes at least one of cadmium sulfide (CdS) and cadmium selenide (CdSe), and a shell which surrounds the core and includes at least one of zinc sulfide (ZnS), cadmium sulfide (CdS) and zinc selenide (ZnSe), and
wherein at least one of trioctylphosphine (TOP) and a ligand of oleic acid are attached on an outer surface of the shell.
6. A backlight assembly comprising:
a substrate;
a plurality of red laser diodes disposed on the substrate, and configured to generate a red laser light;
a plurality of blue laser diodes disposed adjacent to the red laser diodes and on the substrate, and configured to generate a blue laser light or a cyan laser light;
a green phosphor disposed on the blue laser diodes, and configured to change a wavelength of the blue laser light or the cyan laser light;
a light guiding plate comprising a light incident surface configured such that the red laser light enters into the light incident surface and the blue laser light or the cyan laser light enters into the light incident surface, and a light exiting surface disposed adjacent to the light incident surface and configured such that the red laser light exits the light guiding plate through the light exiting surface and the blue laser light or the cyan laser light exits the light guiding plate through the light exiting surface; and
a holographic diffuser disposed between the light incident surface and the red and blue laser diodes.
7. The backlight assembly of claim 6, wherein the red laser diodes and the blue laser diodes are alternately disposed along the light incident surface.
8. The backlight assembly of claim 6, wherein the holographic diffuser is a sheet having a size substantially the same as a size of the light incident surface.
9. The backlight assembly of claim 6, wherein each of the red and blue laser light is diffused by passing the holographic diffuser, wherein the red laser light from the red laser diode which is diffused by passing the holographic diffuser, partially overlaps with the blue laser light or the cyan laser light from an adjacent blue laser diode which is diffused by passing the holographic diffuser, on the light incident surface.
10. The backlight assembly of claim 9, wherein a width of each of the red laser light and the blue laser light on the light incident surface is no greater than a width of the light incident surface.
11. The backlight assembly of claim 10, wherein a horizontal divergence angle of the laser light on the holographic diffuser is about 30° (degrees) to about 85°.
12. The backlight assembly of claim 11, wherein a vertical divergence angle of the laser light on the holographic diffuser is about 5° (degrees) to about 60°.
13. The backlight assembly of claim 6, wherein the holographic diffuser contacts with the light incident surface of the light guiding plate.
14. The backlight assembly of claim 6, wherein the green phosphor contacts with the holographic diffuser.
15. The backlight assembly of claim 6, wherein the light guiding plate further comprises a reflecting surface disposed opposite to the light exiting surface, and a reflecting element disposed under the reflecting surface.
16. The backlight assembly of claim 6, wherein the green phosphor contacts with the blue laser diode.

17. The backlight assembly of claim 6, wherein the green phosphor comprises a quantum dot nano-phosphor,
- wherein the quantum dot nano-phosphor comprises a particle,
- wherein the particle comprises a core which includes at least one of cadmium sulfide (CdS) and cadmium selenide (CdSe), and a shell which surrounds the core and includes at least one of zinc sulfide (ZnS), cadmium sulfide (CdS) and zinc selenide (ZnSe), and
- wherein at least one of trioctylphosphine (TOP) and a ligand of oleic acid are attached on an outer surface of the shell.

18. The backlight assembly of claim 6, wherein the holographic diffuser is disposed between the light incident surface and the red and blue laser diodes and spaced apart from the light incident surface and the red and blue laser diodes and wherein the green phosphor is disposed on a first surface of the holographic diffuser which faces the red laser diodes and the blue laser diodes and overlaps with the blue diodes.

19. The backlight assembly of claim 18, further comprising a sub phosphor disposed on a second surface of the holographic diffuser which faces the light incident surface, wherein the second surface of the holographic diffuser is opposite to the first surface of the holographic diffuser, wherein the sub phosphor is disposed on an area of the second surface of the holographic diffuser corresponding to the green phosphor and the blue laser diodes and wherein the sub phosphor includes a quantum dot nano-phosphor and is configured to change a wavelength of at least one the red laser light, the blue laser light or the cyan light that passes the holographic diffuser.

20. A display apparatus comprising:
- a backlight assembly comprising:
  - a substrate,
  - a plurality of red laser diodes disposed on the substrate, and configured to generate a red laser light,
  - a plurality of blue laser diodes disposed adjacent to the red laser diodes and on the substrate, and configured to generate a blue laser light or a cyan laser light,
  - a green phosphor disposed on the blue laser diodes, and configured to change a wavelength of the blue laser light or the cyan laser light,
  - a light guiding plate comprising a light incident surface configured such that the red laser light enters into the light incident surface and the blue laser light or the cyan laser light enters into the light incident surface, and a light exiting surface disposed adjacent to the light incident surface and configured such that the red laser light exits the light guiding plate through the light exiting surface and the blue laser light or the cyan laser light exits the light guiding plate through the light exiting surface, and
  - a holographic diffuser disposed between the light incident surface and the red and blue laser diodes;
- a display panel disposed on the backlight assembly; and
- a receiving container configured to receive the backlight assembly and the display panel therein,
- wherein the red laser diodes and the blue laser diodes are alternately disposed along the light incident surface.

21. The display apparatus of claim 20, further comprising an optical element configured to make a brightness of the laser light from the light guiding plate uniform.

22. The display apparatus of claim 21, wherein the light guiding plate further comprises a reflecting surface disposed opposite to the light exiting surface, and a reflecting element disposed under the reflecting surface.

23. A backlight assembly comprising:
- a substrate;
- a plurality of red laser diodes and a plurality of blue laser diodes alternatively disposed on the substrate, and wherein the red laser diodes are configured to generate a red laser light and the blue laser diodes are configured to generate a blue laser light or a cyan laser light;
- a light guiding plate comprising a light incident surface configured such that the red laser light enters into the light incident surface and the blue laser light or the cyan laser light enters into the light incident surface, and a light exiting surface disposed adjacent to the light incident surface and configured such that the red laser light exits the light guiding plate through the light exiting surface and the blue laser light or the cyan laser light exits the light guiding plate through the light exiting surface;
- a green phosphor disposed directly on the light incident surface of the light guiding plate on an area of the light incident surface corresponding to the blue laser diode, wherein the green phosphor is configured to change a wavelength of the blue laser light or the cyan laser light; and
- a holographic diffuser disposed in between the light incident surface and the red and blue laser diodes and spaced apart from the light incident surface and the red and blue laser diodes.

* * * * *